United States Patent [19]

Ericsson

[11] Patent Number: 4,991,673
[45] Date of Patent: Feb. 12, 1991

[54] CROSS-COUNTRY VEHICLE OR MACHINE
[75] Inventor: Jan E. Ericsson, Umeå, Sweden
[73] Assignee: Umea Mekaniska AB, Umea, Sweden
[21] Appl. No.: 315,227
[22] Filed: Feb. 24, 1989

Related U.S. Application Data
[63] Continuation of Ser. No. 45,241, May 4, 1987, abandoned, which is a continuation of Ser. No. 637,826, Aug. 6, 1984, abandoned.

[30] Foreign Application Priority Data
Aug. 5, 1983 [SE] Sweden .............................. 8304292

[51] Int. Cl.⁵ ............................................. B60G 17/04
[52] U.S. Cl. .................................... 180/41; 180/9.52; 180/9.1; 280/840; 414/728; 414/743
[58] Field of Search ............ 180/41, 901, 9.52, 89.14, 180/906; 280/840, DIG. 1, 707, 772; 414/728, 743

[56] References Cited
U.S. PATENT DOCUMENTS

| 1,159,841 | 11/1915 | Holt ................................... 180/41 X |
| 2,918,292 | 12/1959 | Carmichael, Jr. et al. ....... 180/41 X |
| 3,398,967 | 8/1968 | Brocklebank et al. ........... 180/41 X |
| 4,147,263 | 4/1979 | Frederick et al. ............... 414/728 X |
| 4,324,304 | 4/1982 | Hashimoto et al. ............... 180/9.52 |
| 4,326,571 | 4/1982 | Crawford ....................... 280/6 H X |
| 4,365,927 | 12/1982 | Schenek ........................... 180/41 X |
| 4,580,797 | 4/1986 | Ericsson ............................. 280/6 H |

FOREIGN PATENT DOCUMENTS

| 1370019 | 7/1964 | France .................................. 180/41 |
| 618600 | 8/1978 | U.S.S.R. ............................. 280/6 H |
| 852617 | 10/1960 | United Kingdom ................. 180/41 |

Primary Examiner—Mitchell J. Hill
Attorney, Agent, or Firm—Cushman, Darby & Cushman

[57] ABSTRACT

A cross-country vehicle includes a mobile chassis and a superstructure carrying a driver's cab wherein the superstructure is mounted on the chassis for tilting movement about a horizontal axis and a transverse axis and wherein a hydraulic cylinder on each side of the longitudinal axis acts between the chassis and the superstructure to tilt the superstructure about either or both axes in order to position the superstructure horizontally as the vehicle moves over rough ground.

3 Claims, 4 Drawing Sheets

CROSS-COUNTRY VEHICLE OR MACHINE

This is a continuation of application Ser. No. 07/045,241, filed May 4, 1987, which was abandoned upon the filing hereof, which was a continuation of application Ser. No. 06/637,826, filed Aug. 6, 1984 (abandoned).

BACKGROUND OF THE INVENTION

This invention relates to a cross-country vehicle or machine with a superstructure arranged on the chassis of the vehicle or machine in the form of for instance a driver's cab, crane and/or one or more other working tools.

On machines such as forest machines provided with a driver's cab, this is normally rigidly connected to the chassis, of the machine and follows in this way the movements of the chassis slavishly always arising upon passage over obstacles on the ground. These movements can be very great and violent sideways as well as forwards and backwards, and do not promote the driver's working conditions within his cab, but sooner the contrary.

The rigid mounting of the driver's cab relative to the chassis has also the disadvantage that the cab is inclined in one direction or the other as soon as the machine is stopped on non-horizontal ground for work, and this circumstance is very troublesome for the driver, especially in machines of the excavator type, where the driver's cab, together with the working tool, is pivotable by means of a roller path around a vertical shaft relative to the chassis. This type of machine must as a rule, have a horizontal ground to operate in the intended way and in order not to be exposed to too great stresses.

In order to overcome this problem and to attain better working conditions for the driver, attempts have been made with gyro-suspended driver's seats and with various types of hydraulically-operated systems with swing arms and axles, enabling a certain adjustment of the wheels of the machine relative to the chassis. However, these systems are relatively complicated and expensive.

SUMMARY OF THE INVENTION

It is therefore the object of this invention to provide a cross-country vehicle or machine, not beset with said shortcomings, but so constituted that at least the driver's cab can be leveled and kept substantially horizontal independently of the ground conditions and without the axles supporting the wheels or the swing arms necessarily being influenced. Moreover, the solution of these problems must according to the invention, be simple as to its structure and cheap to manufacture and assemble and must be capable of being applied to already existing vehicles and machines without any big operations being required.

BRIEF DESCRIPTION OF THE DRAWINGS

In the following the invention is described more in detail with reference to the enclosed drawings, in which.

DETAILED DESCRIPTION

Figure 1:
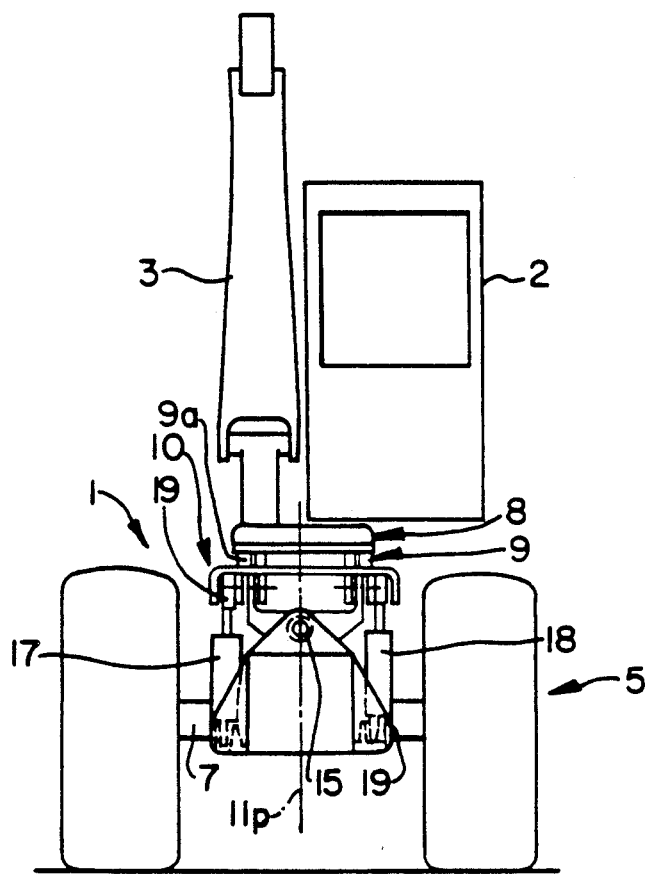
FIG. 1 shows schematically an end view of a machine according to the invention standing horizontally.

In the drawings, 1 designates generally a chassis of a cross-country, articulated forest machine provided with a superstructure which, in the example shown, in the drawings, consists of a driver's cab 2 and a working tool in the form of a crane 3 with a processing or felling aggregate assembly 4, but which may comprise merely the driver's cab 2. The driver's cab 2 as well as the working tools 3, 4 are placed in the same portion of the articulated machine, e.g. on its front portion 5, which, like its rear portion 6, is shown as provided with one wheel shaft 7 each. It should be pointed out that this invention is applicable to all types of vehicles and machines independently of the form of their chassis and types of wheel suspension.

In the embodiment of the invention, only shown as an example, the driver's cab 2 as well as the working tools 3, 4 are arranged on a common platform 8, which is rotatably mounted by means of a roller path 9 on a carrying means 10 for rotational movement about a vertical axis 11 relative to the plane of the carrying means.

In accordance with the principles on which this invention is based, the carrying means 10 consists of a planar tilt plate 12, on the upper side of which the roller path 9 is supported, and a holding means 13, i.e. a holder, the cross-section of which is substantially U-shaped. The tilt plate 12 is through a shaft or shaft pins 14 parallel to the wheel shaft 7 of the front vehicle portion pivotably associated with the substantially U-shaped holding means 13 which, in its turn, is supported by a support shaft 15 arranged substantially perpendicular to the pivot shaft 14 of the tilt plate. This shaft 15 is located in the intermediate plane of the chassis rotatably mounted in bearing cages 16 arranged at the chassis 1 of the front vehicle portion. Accordingly, the shaft 15 provides a first, longitudinal axis about which the superstructure is pivotable relative to the chassis, and the pin 14 provides a second, transverse axis about which the superstructure is pivotable relative to the chassis. Instead of having the carrying shaft 15 rotatably mounted the U-shaped holding means 13 can be rotatably arranged on the carrying shaft 15. The carrying shaft should preferably, but not necessarily, be located in the longitudinal vertical central plane lip of the machine, i.e. the longitudinal vertical central plane preferably coincides with the axis indicated by the line 11 indicated in FIG. 1. Thus, the superstructure is supported like in a universal joint by the carrying means 10, i.e. is rotatable in two planes perpendicular to one another, one of which should preferably be parallel to the wheel shafts 7 of the machine.

The carrying means 10, more specifically its tilt plate 12, is further connected to the chassis 1 of the machine, i.e. with the chassis of the front vehicle portion 5 in the design shown on the drawings, by two pressure medium cylinders 17, 18 which are arranged, each on a respective side of the support shaft 15 and at the same distance from it and is articulatedly attached to the tilt plate 12 as well as to the chassis 1 by means of pivot pins 19. The two pressure medium cylinders 17, 18, are arranged to hold the tilt plate in an intermediate position, so that it is parallel to the chassis 1 of the machine.

The pressure medium cylinders 17, 18, which are double-acting, are connected via conduits 19a, 20 each to a respective controlled, four-way three-position valve 21 with spring return to a closed, central position, which valves are arranged as operating valves of the two cylinders 17, 18. These valves are connected via a conduit 22 to a pressure medium source P and through a conduit 23 to tank T.

The cylinders are locked against motion by the operating valves 2 set to their closed, intermediate position C and by adjusting one and/or the other operating valve into one of its or their two other positions A, B, the pressure medium cylinders can be operated quite individually and as desired, to obtain a leveling of the superstructure 2; 3, 4 independently of ground conditions and inclination of the chassis 1.

Figure 2:
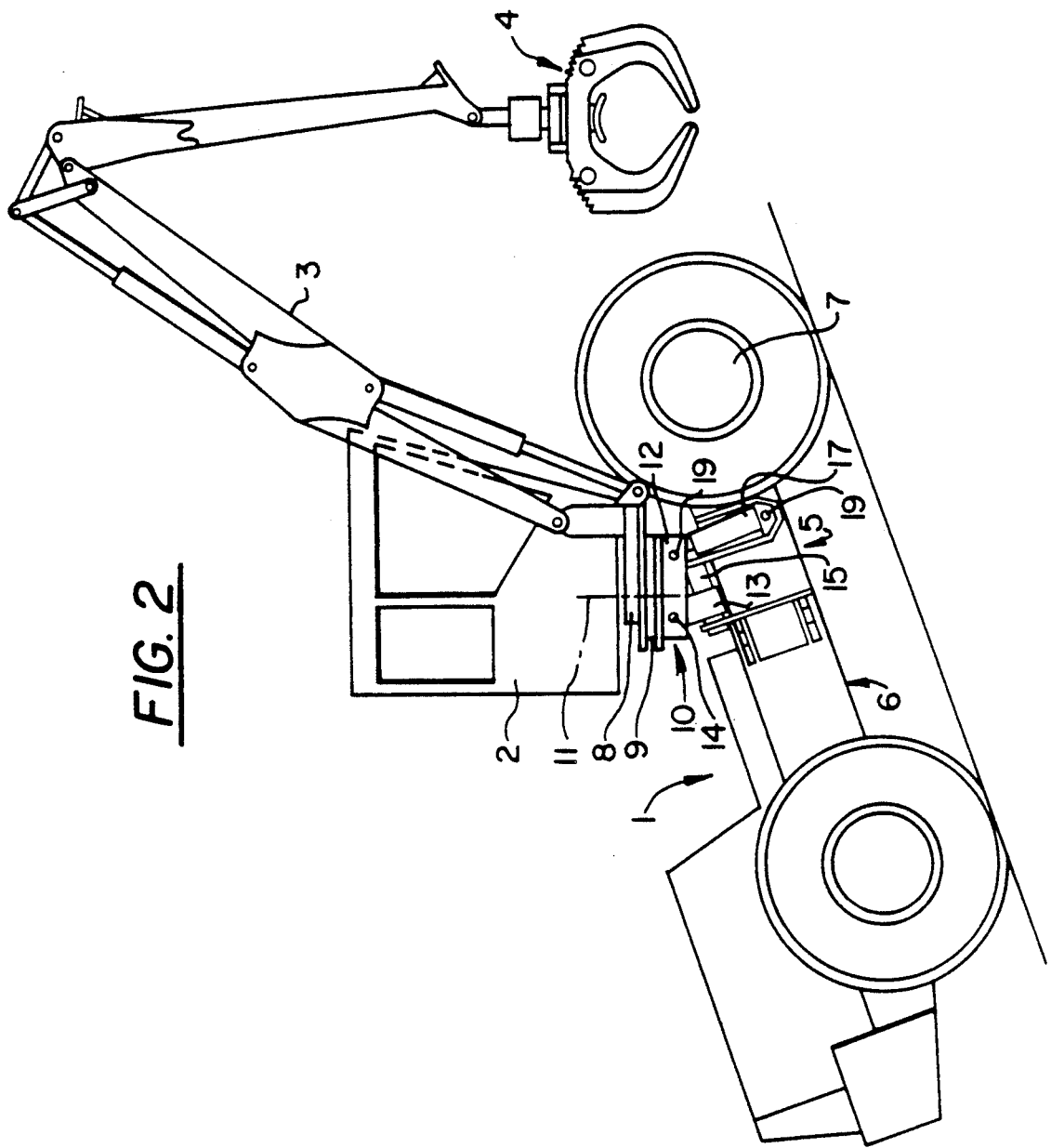
FIGS. 2 and 3 show schematically lateral views of the machine as standing in an ascent and a descent, respectively.

In FIG. 2, the machine is shown standing in an ascent, and for leveling the superstructure 2 in such a case the two operating valves 21 are set at the same time to position B, pressure medium being introduced into the cylinders 17, 18 on their piston rod side, with the result that the tilt plate is turned clock-wise in FIG. 2 around the shaft 14 until it becomes substantially horizontal, the operating valves returning to their closed, central position and locking the cylinders 17, 18 in the set position.

Figure 3:
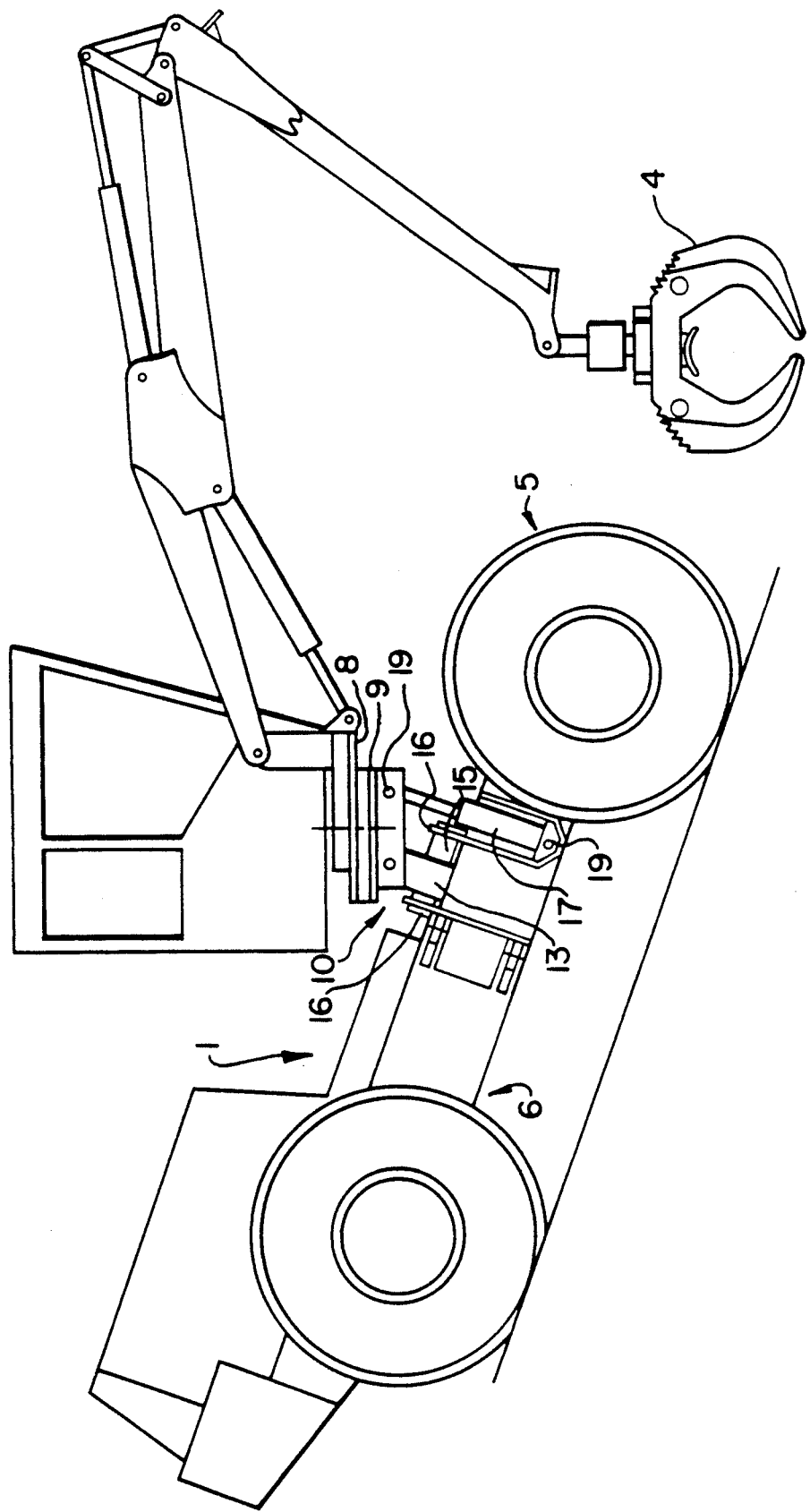
Figure 4:
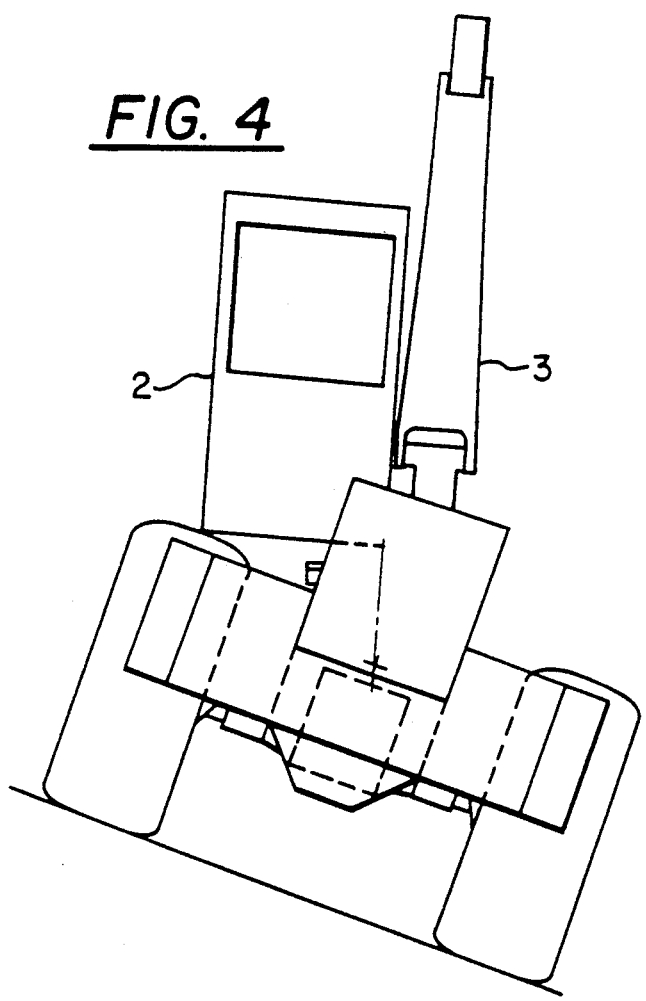
FIG. 4 shows an end view of the machine standing crosswise in a descent and FIG. 5 shows a pressure medium scheme.
Figure 5:
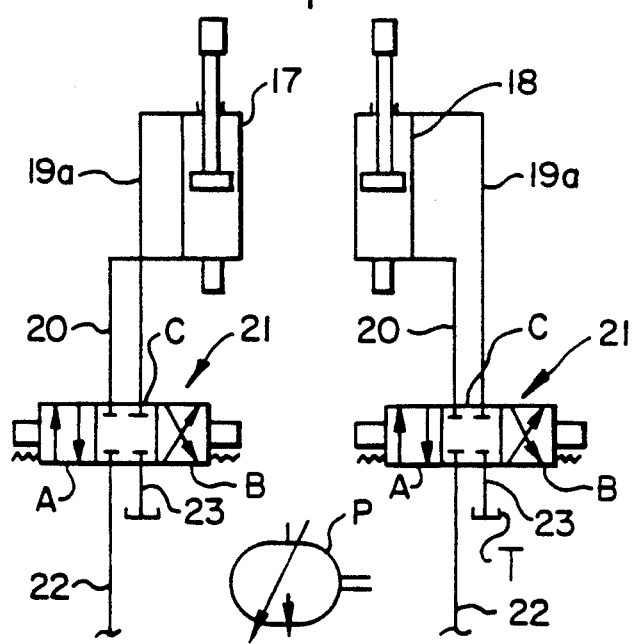

By adjusting the operating valves in their position A, leveling of the driver's cab 2 is obtained for a machine standing on or traveling down a descent, as shown in FIG. 3, and, if one operating valve 21 is set to position A and the other operating valve to position B, the carrying means 10 is thus swung around the supporting shaft 15 for leveling the superstructure 2, 3, 4 sideways as shown in FIG. 4. The superstructure can in principle always be maintained substantially horizontal, independently of the ground conditions, by means of the pressure medium cylinders 17, 18 and their operating valves 21 and leveling or horizontalizing can be achieved for inclinations of up to at least 15°-25°. Horizontalizing can take place automatically by means of position-indicating means, or manually from the driver's cab.

This invention is not restricted to what has been described above and shown in the drawings, but can also be changed and modified in many different manners within the scope of the inventive idea indicated in the claims. Nor is the invention restricted to any certain type of vehicle or machine.

What is claimed is:

1. A mobile cross-country vehicle, including:
    a chassis having longitudinal and transverse dimensions, including an imaginary longitudinal vertical center plane;
    ground-engaging support members mounted to said chassis for supporting the chassis on the ground;
    a superstructure including a driver's cab;
    means mounting the superstructure on the chassis, said mounting means including:
        means providing a first pivot axis extending longitudinally of said vehicle,
        means providing a second pivot axis extending transversally of said vehicle; and
    means for pivoting said superstructure about said first, longitudinally-extending pivot axis, for tilting said superstructure leftwardly and rightwardly relative to said chassis, and for pivoting said superstructure about said second, transversally-extending pivot axis, for tilting said superstructure up in front and down in front relative to said chassis;
    said pivoting means including at least two pressure cylinders, including at least one disposed to the left of said longitudinal vertical center plane and at least another disposed to the right of said longitudinal vertical center plane, each said pressure cylinder being mounted to act effectively between said chassis and said superstructure, at corresponding locations displaced longitudinally along said vehicle from said second, transversally-extending axis, whereby,
        (a) said one and another pressure cylinders, when extended and retracted by equal amounts, cause said superstructure to pivot about said second axis but not about said first axis, whereas
        (b) when said one or another pressure cylinders is extended and retracted with said another or one being correspondingly retracted and extended, cause said superstructure to pivot about said first axis but not about said second axis, and
        (c) when said one and another pressure cylinders are extended and retracted by other amounts than specified in (a) and (b), said superstructure pivots about both said first, longitudinally-extending axis and said second, transversally-extending axis.

2. The vehicle of claim 1, wherein:
    said mounting means includes:
        a tilt plate on which said superstructure is mounted;
        a support shaft providing said first pivot axis, and means mounting said support shaft on said chassis for rotation about said first pivot axis;
        a holder rigidly attached to said support shaft;
        pin means pivotally mounting said holder to said tilt plate and providing said second pivot axis; and
        transversally-extending pivot pins pivotally connecting said pressure cylinders, at opposite ends of said pressure cylinders, respectively to said chassis and said tilt plate.

3. The vehicle of claim 2, wherein:
    said tilt plate comprises a rotatable portion on which said superstructure is mounted and a non-rotatable portion which is mounted to said holder by said pin means, said rotatable portion being rotatably mounted by means of a roller path on said non-rotatable portion for rotational movement about a vertical axis relative to a plane of said non-rotatable portion whereby said superstructure can be rotated relative to said chassis about said rotational axis.

* * * * *